United States Patent [19]

Lagakos et al.

[11] Patent Number: 4,621,896

[45] Date of Patent: Nov. 11, 1986

[54] OPTICAL FIBERS WITH REDUCED PRESSURE SENSITIVITY TO HIGH FREQUENCY ACOUSTIC FIELD

[75] Inventors: Nicholas Lagakos, Silver Spring, Md.; James H. Cole, Great Falls; Joseph A. Bucaro, Herndon, both of Va.

[73] Assignee: The United States of America as represented by the Secretary of the Navy, Washington, D.C.

[21] Appl. No.: 635,693

[22] Filed: Jul. 30, 1984

[51] Int. Cl.$^4$ .............................................. G02B 6/20
[52] U.S. Cl. ........................... 350/96.29; 350/96.30; 350/96.33
[58] Field of Search ............... 350/96.23, 96.29, 96.30, 350/96.33

[56] References Cited

U.S. PATENT DOCUMENTS

| | | | |
|---|---|---|---|
| 4,000,936 | 1/1977 | Gloge | 350/96.23 |
| 4,076,382 | 2/1978 | Oestreich | 350/96.23 |
| 4,105,284 | 8/1978 | Olshansky | 350/96.33 |
| 4,113,349 | 9/1978 | Stiles | 350/96.23 |
| 4,149,772 | 4/1979 | Iyengar et al. | 350/96.33 |
| 4,334,733 | 6/1982 | Takeshima | 350/96.33 |
| 4,363,533 | 12/1982 | Stowe et al. | 350/96.33 |
| 4,418,984 | 12/1983 | Wysocki et al. | 350/96.33 |
| 4,427,263 | 1/1984 | Lagakos et al. | 350/96.29 X |
| 4,504,113 | 3/1985 | Back | 350/96.33 |

FOREIGN PATENT DOCUMENTS 1524316 9/1978 United Kingdom .

OTHER PUBLICATIONS

"Ultrasonic Sensitivity of Coated Fibers" by Lagakos et al. Journal of Lightwave Technology, vol. LT-1, No. 3, Sep. 1983.
"Pressure Desensitization of Optical Fibers" by Lagakos et al, Applied Optics/vol. 20, No. 15/Aug. 1, 1981.

Primary Examiner—William L. Sikes
Assistant Examiner—Akm E. Ullah
Attorney, Agent, or Firm—Sol Sheinbein; Ansel M. Schwartz

[57] ABSTRACT

A pressure insensitive optical fiber waveguide comprising an optical fiber including an optical core and a concentric cladding; a substrate concentrically surrounding the optical fiber; and a fiber jacket substrate including at least two coatings concentrically surrounding the substrate wherein the innermost coating has a small Young's modulus and the outermost coating has a high Young's modulus.

15 Claims, 2 Drawing Figures

OPTICAL FIBERS WITH REDUCED PRESSURE SENSITIVITY TO HIGH FREQUENCY ACOUSTIC FIELD

BACKGROUND OF THE INVENTION

Minimizing pressure sensitivity of optical fibers is important where they are used as lead and as reference fibers to phase modulated, interferometric sensors. In optical fiber acoustic sensors it is desirable to localize the fiber sensitivity by making the lead optical fibers pressure insensitive. In other optical fiber sensors (e.g., temperature and magnetic), it is desirable to desensitize the fiber including even the sensing area to acoustic wave pressure because such acts as a noise source. It is important to localize the fiber sensitivity to a desired area.

In general, the sensitivity of an optical fiber is a complicated function of the elastic and elasto-optic coefficients of the optical fiber, the elastic coefficient of the coating and the thickness of the various fiber layers. The pressure sensitivity of the optical phase in a fiber is defined as $\Delta\phi/\phi\Delta P$, where $\Delta\phi$ is the shift in the optical phase delay $\phi$ due to a pressure change P. If a given pressure change, $\Delta P$, results in a fiber core axial strain $\epsilon_z$ and radial strain $\epsilon_r$, then it can be shown that (see N. Lagakos and J. A. Bucaro, "Pressure Desensitization of Optical Fibers," Appl. Opt. 20, 2716 (1981)):

$$\frac{\Delta\phi}{\phi} = \epsilon_z - \frac{n^2}{2}[(P_{11} + P_{12})\epsilon_r + P_{12}\epsilon_z] \quad (1)$$

Here $P_{11}$ and $P_{12}$ are the elasto-optic coefficients of the core and n is the refractive index of the core. The first term in Eq. (1) is the part of $\Delta\phi/\phi\Delta P$ which is due to the fiber length change, while the second and third terms are the parts due to the refractive index modulation of the core, which is related to the photoelastic effect. In order to calculate the sensitivity as given by Eq. (1), the strains in the cores $\epsilon_z$ and $\epsilon_r$ must be related to properties of the various layers of the fiber. The various constants involved in these calculations are found from the appropriate boundary conditions. The details of this analysis have been reported in "Pressure Desensitization of Optical fibers," by N. Lagakas and J. A. Bucaro, Appl. Opt. 20, 2716 (1981).

As can be seen from Eq. (1), the sensitivity of an optical fiber is related to the combined effects of pressure induced fiber length changes and strain induced index of refraction effects. For low frequencies where pressure is hydrostatic, these effects are generally of opposite polarity. Accordingly, pressure insensitivity can be achieved by balancing these effects. In particular, it is possible to achieve this by designing fibers consisting of a glass core with a relatively low bulk modulus and a glass substrate with a high bulk modulus. The glass fiber can then be coated in the usual way, first with a soft rubber and then with a hard plastic. Pressure insensitive fibers can also be achieved by applying a high bulk modulus glass substrate or metal coating to conventional fibers.

High frequency acoustic fields, however, generate radial strains only. In this case, the axial strain $\epsilon_z$, becomes zero. There is no proposed way of making optical fibers with reduced pressure phase sensitivity to radial strains only.

SUMMARY OF THE INVENTION

Accordingly, one object of this invention is to provide a novel optical fiber with reduced phase sensitivity to high frequency (e.g., ultrasonic) acoustic fields.

These results can be accomplished by concentrically surrounding an optical fiber with a coating of low bulk modulus which in turn is surrounded by a high bulk modulus material. Such a composition minimizes the fiber phase sensitivity to radial strains which are generated by high frequency acoustic fields.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein.

DESCRIPTION OF THE PREFERRED EMBODIMENTS

Figure 1:
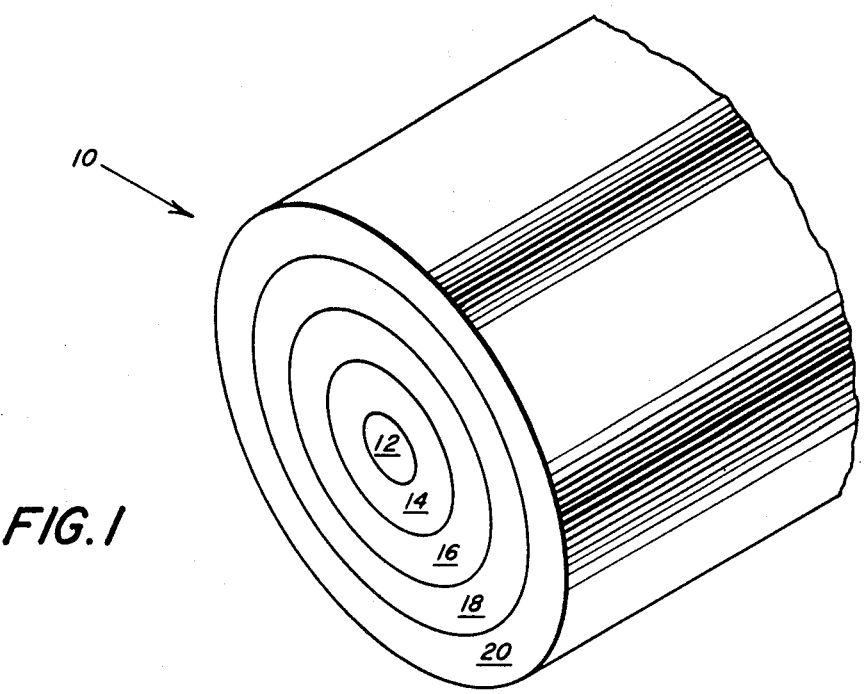
FIG. 1 is a cross-sectional view, not necessarily to scale, of an optical fiber designed in accordance with the principles of the invention.

The invention comprises a fiber jacket having a high young's modulus outer layer and a low young's modulus inner layer. FIG. 1 shows one embodiment of the present invention wherein a standard optical fiber composed of a core 12, cladding 14 and a substrate 16 with a fiber jacket 22 that includes a low young's modulus coating 18 surrounded by a high young's modulus coating 20. The low young's modulus coating 18 in conjunction with the high young's modulus coating operates to cause the fiber to have a reduced pressure sensitivity to high frequency acoustic fields.

In the embodiment shown in FIG. 1, the glass waveguide 10 may be a typical one composed of a fused silica core 12 of 4 $\mu$m o.d. with traces of $G_eO_2$, a cladding 14 of 24 $\mu$m o.d. 5% $B_2O_3 + 95\%$ $SiO_2$, and a 84 $\mu$m o.d. fused silica substrate 16. The fiber jacket consists of a 100 $\mu$m o.d. silicone layer 18 and a 140 $\mu$m o.d. nickel layer 20. The sensitivity of this fiber is $\Delta\phi/\phi\Delta P = +0.18 \times 10^{-13}$ (dyn/cm$^2$). The sensitivity of base waveguide (without the jackets) is $+0.45 \times 10^{-12}/(\text{dyn/cm}^2)$. The sensitivity of a typical plastic fiber (such as "Cofron" made by DuPont) is $+0.3 \times 10^{-11}$(dyn/cm$^2$), and the sensitivity of a silicone fiber is $+0.2 \times 10^{-10}$(dyn/cm$^2$). From here we see that the proposed fiber (See Table 1) has a substantially reduced sensitivity.

TABLE I

| | SINGLE-MODE FIBER | | | | |
|---|---|---|---|---|---|
| | Core | Clad | Substrate | First Coating | Outer Coating |
| Composition | $S_iO_2$ + traces of $G_eO_2$ (0.1%) | 95% $S_iO_2$ 5% $B_2O_3$ | $S_iO_2$ | Silicone | Nickel |
| Diameter ($\mu$m) | 4 | 26 | 84 | 100 | 140 |
| Young's Modulus | 72 | 65 | 72 | 0.0276 | 214 |

TABLE I-continued

| | SINGLE-MODE FIBER | | | | |
|---|---|---|---|---|---|
| | Core | Clad | Substrate | First Coating | Outer Coating |
| ($10^{10}$ dyne/cm$^2$) | | | | | |
| Poisson's Ratio | 0.17 | 0.149 | 0.17 | 0.4954 | 0.336 |
| $P_{11}$ | 0.126 | | | | |
| $P_{12}$ | 0.27 | | | | |
| n | 1.458 | | | | |

$\frac{\phi}{\phi \Delta P} = 0.18 \times 10^{-13}/(\text{dyne/cm}^2)$.

The use of a substrate is optional and can be omitted from the overall structure. If the substrate is omitted, the cladding should be made thicker with an o.d. equal to what was the substrate's o.d.

When a high frequency acoustic field (ultrasonic) is applied to the fiber it generates radial strain only since any axial strain is well localized in the time scale of the period of the incident wave. Radial strain, and therefore the ultrasonic sensitivity, is significantly reduced by the proposed fiber. A simplified explanation of this can be given as follows: at ultrasonic frequencies, a pressure applied to the fiber will produce a small radial strain on the outer hard coating due to its high young's modulus. As the outer jacket moves inward, a small radial strain is developed in the soft inner coating. However, because of the low young's modulus of the inner coating, a very small radial stress is communicated to the glass fiber. Therefore, the combination of a hard and a soft coating minimizes the radial strain in the core of a fiber and, thus, the phase sensitivity of the fiber to high frequency acoustic fields.

In general, as it was mentioned above, the sensitivity of an optical fiber is a complicated function of the elastic and elastooptic coefficients of the optical fiber, the elastic coefficients of the coating and the thickness of the various fiber layers. The polar stresses $\sigma_r$, $\sigma_\theta$, and $\sigma_z$ in the fiber are related to the strains $\epsilon_r$, $\epsilon_\theta$, and $\epsilon_z$ as follows:

$$\begin{bmatrix} \sigma_r^i \\ \sigma_\theta^i \\ \sigma_z^i \end{bmatrix} = \begin{bmatrix} (\lambda^i + 2\mu^i) & \lambda^i & \lambda^i \\ \lambda^i & (\lambda^i + 2\mu^i) & \lambda^i \\ \lambda^i & \lambda^i & (\lambda^i + 2\mu^i) \end{bmatrix} \begin{bmatrix} \epsilon_r^i \\ \epsilon_\theta^i \\ \epsilon_z^i \end{bmatrix} \quad (2)$$

where i is the layer index (0 for the core, 1 for the cladding etc.), and $\lambda^i$ and $\mu^i$ are the Lame parameters which are related to young's modulus $E^i$ and Poisson's ratio $\nu^i$ as follows:

$$\lambda^i = \frac{\gamma^i E^i}{(1 + \gamma^i)(1 + 2\gamma^i)}, \quad \mu^i = \frac{E^i}{2(1 + \nu^i)} \quad (3)$$

For a cylinder the strains can be obtained from the Lame solutions given in "Theory of Elasticity" Timoshenko and Goodier, McGraw Hill, 1970, ch. 4 where:

$$\epsilon_r^i = \mu_o^i + \frac{\mu_1^i}{r_2}, \quad \epsilon_\theta^i = \mu_o^i - \frac{\mu_1^i}{r_2}, \quad \epsilon_z^i = W_o^i \quad (4)$$

$U_o^i$, $U_1^i$, and $W_o^i$ are constants to be determined. Since the strains must be finite at the center of the core, $U_1^o = 0$.

For a fiber with m layers the constants $U_o^i$, $U_1^i$, and $W_o^i$ in Eq. (4) are determined from the boundary conditions:

$$\sigma^i|_{r=r_i} = \sigma^{i+1}|_{r=r_i} (i = 0, 1 \ldots m-1)_1 \quad (5)$$

$$U_r^i|_{r=r_i} = U_r^{i+1}|_{r=r_i} (i = 0, 1 \ldots m-1), \quad (6)$$

$$\sigma_r^m|_{r=r_m} = -P, \quad (7)$$

$$\epsilon_z^0 = \epsilon_z^1 = \ldots = \epsilon_z^m = 0 \quad (8)$$

where $U_r^i (= \int \epsilon^i dr)$ is the radial displacement in the ith layer, and $r_i$ is the radius of the ith layer. Equations (5) and (6) describe the radial stress and displacement continuity across the boundaries of the layers. Equations (7) and (8) assume that the applied pressure is radially constrained. Using the boundary conditions described by Eqs. (5) to (8) the constants $U_o^i$, $U_1^i$, and $W_o^1$ are determined and $\epsilon_r^o$ is calculated from Eq. (4). Then from Eq. (1) the sensitivity $\Delta\phi/\phi\Delta P$ can be found by known analytic methods. Consequently the resulting sensitivity for a fiber with a two-layered surrounding jacket is:

$$\frac{\Delta\phi}{\Delta P \phi} = \frac{n^2}{2} [P_{11} + P_{12}] F_o \cdot \frac{\left(F_2 + \frac{1}{2G_2}\right)\left(F_1 + \frac{1}{2G_1}\right)}{(F_1 - F_o)H}$$

where $$H = F_2 r_{02}^2 - \frac{1}{2G_2} [r_{01}^2 - r_{02}^2 - 1] - \left[\frac{1}{2G_2} + 1\right]\left(\frac{F_1 + \frac{1}{2G_1}}{F_o - F_1}\right) + 1 - \frac{r_{01}^2}{2G_1}$$

and where $$F_0 = \frac{(1 - \gamma_o - 2\gamma_o^2)}{E_0},$$

$$F_1 = \frac{(1 - \gamma_1 - 2\gamma_2^2)}{E_1},$$

$$F_2 = \frac{(1 - \gamma_2 - 2\gamma_2^2)}{E_2},$$

$$\frac{1}{2G_1} = \frac{1 + \gamma_1}{E_1}, \quad \frac{1}{2G_2} = \frac{1 + \gamma_2}{E_2}, \quad r_{01} = \frac{r_0}{r_1}, \quad r_{02} = \frac{r_0}{r_2}$$

Here $E_i$, $G_i$ and $r_i$ are the young's modulus, the shear modulus and the radius, respectively, with i=0 for the glass fiber, i=1 for the soft layer in the jacket and i=2 for the hard layer in the jacket.

An alternative to the above mentioned fiber is a fiber coated first with a soft elastomer (e.g. silicone), then with a harder polymer (e.g., Hytrel ™, which is a plastic coating sold by Dupont), and then with an outer high young's modulus material (e.g. Ni).

Figure 2:
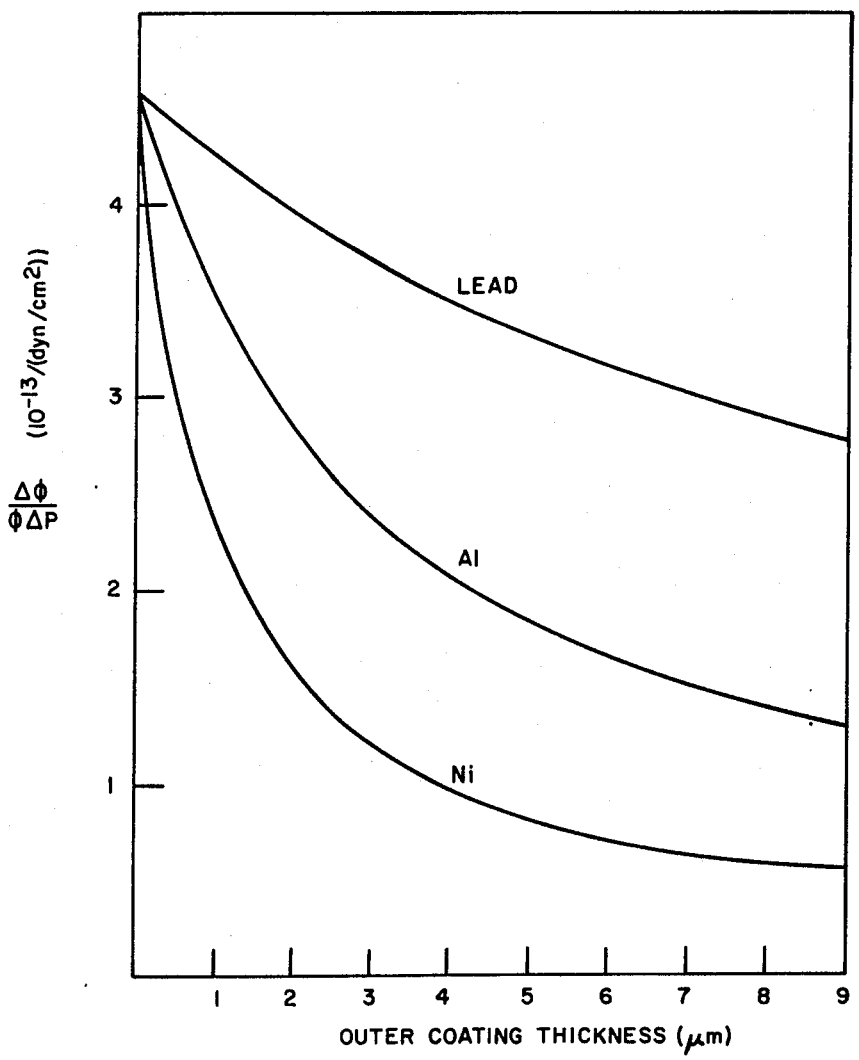
FIG. 2 is a plot of the ultrasonic sensitivity versus thickness of the outer coating of a single mode fiber (table 1) jacketed with a 100 $\mu$m o.d. silicone soft coating and an outer hard coating (lead, aluminum and nickel.)

Besides Nickel, high young's modulus metals, such as Aluminum, Chromium and Copper (see FIG. 2), high young's modulus glasses or ceramics and high young's modulus elastomers, such as acrylic reduce the fiber sensitivity to high frequency acoustic fields. The high young's modulus material should be greater than $50 \times 10^{10}$ dyne/cm$^2$. FIG. 2 evidences that the sensitivity is reduced due to the material used for the hard outer coating, as well as the thickness of the hard outer coating thus also allowing lower young's modulus metals such as lead to be used but only at a much greater jacket thickness. Ideally, what is desired is a fiber insensitive to high frequency acoustical fields that has as thin a jacket as possible. Additionally, there are a great number of soft materials and some metals which have a low young's modulus and may be used instead of silicone. Any of the rubbers may be used for the soft first coating. The low young's modulus material should be less than $1 \times 10^{10}$ dyne/cm$^2$.

The optical fiber waveguide suggested here may be produced with known optical fiber waveguide manufacturing techniques. Obviously, numerous (additional) modifications and variations of the present invention are possible in light of the above teachings. It is therefore to be understood that within the scope of the appended claims, the invention may be practiced otherwise than as specifically described herein.

What is claimed as new and desired to be secured by Letters Patent of the United States is:

1. An optical fiber waveguide that has reduced pressure sensitivity to high frequency acoustic fields in a fluid comprising:
   an optical fiber including an optical core and concentric cladding;
   and a fiber jacket disposed over said concentric cladding and including at least two coatings concentrically surrounding the optical fiber wherein the innermost coating has a low young's modulus and the outermost coating has a high enough young's modulus to reduce radial strains in the optical core by impeding the energy transfer from the acoustic fields in the fluid to the core.

2. An optical fiber waveguide as described in claim 1 wherein the low young's modulus material should be less than $1 \times 10^{+10}$ dyne/cm$^2$ and the high young's modulus material should be greater than $50 \times 10^{10}$ dyne/cm$^2$.

3. An optical fiber waveguide as described in claim 2 wherein the low young's modulus material consists of rubber.

4. An optical fiber waveguide as described in claim 3 wherein the low young's modulus material consists of silicone.

5. An optical film waveguide as described in claim 2 wherein the high young's modulus material consists of Nickel, Aluminum, Chromium or Copper, or high young's modulus glasses or ceramics.

6. An optical fiber waveguide as described in claim 5 wherein the high young's modulus material consists of Nickel.

7. An optical fiber waveguide that has reduced pressure sensitivity to high frequency acoustic fields in a fluid comprising:
   an optical fiber including an optical core and a concentric cladding;
   a substrate concentrically surrounding the optical fiber;
   and a fiber jacket including at least two coatings concentrically surrounding the substrate wherein the innermost coating has a small young's modulus and the outermost coating has a high enough young's modulus to reduce radial strains in the optical core by impeding the energy transfer from the acoustic fields in the fluid to the core.

8. An optical fiber waveguide as described in claim 7 wherein the low young's modulus material should be less than $1 \times 10^{-10}$ dyne/cm$^2$ and the high young's modulus material should be greater than $50 \times 10^{10}$ dyne/cm$^2$.

9. An optical fiber waveguide as described in claim 8 wherein the low young's modulus material consists of rubber.

10. An optical fiber waveguide as described in claim 9 wherein the low young's modulus material consists of silicone.

11. An optical film waveguide as described in claim 8 wherein the high young's modulus material consists of Nickel, Aluminum, Chronium or Copper, or of high young's modulus glasses or ceramics.

12. An optical fiber waveguide as described in claim 11 wherein the high young's modulus material consists of Nickel.

13. An optical fiber waveguide as described in claim 2 wherein the fiber jacket includes a coating of a hard polymer concentrically surrounding the innermost coating, and said hard polymer coating being concentrically surrounded by the outermost coating.

14. An optical fiber waveguide as described in claim 7 wherein the fiber jacket includes a coating of a hard polymer concentrically surrounding the innermost coating, and said hard polymer coating being concentrically surrounded by the outermost coating.

15. A method for forming an optical fiber waveguide with reduced sensitivity to high frequency acoustic fields and including an optical core and concentric cladding, comprising the steps of:
   applying a coating of low young's modulus which is less than $1 \times 10^{10}$ dyne/cm$^2$ concentrically around said cladding;
   applying a coating of high young's modulus material which is greater than $50 \times 10^{10}$/cm$^2$ concentrically around said low young's modulus coating to reduce radial strains in the optical care by impeding the energy transfer from the acoustic fields in the fluid to the core;
   wherein the resultant optical fiber waveguide has a reduced pressure sensitivity to high frequency acoustic fields.

* * * * *